Figure 1:
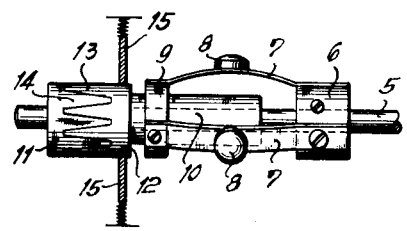

June 28, 1960  G. HERRMANN  2,943,252
SPEED REGULATION OF ELECTRIC MOTORS
Filed May 27, 1957

INVENTOR
GUENTER HERRMANN
By Wenderoth, Lind & Ponack
Attys

United States Patent Office 2,943,252
Patented June 28, 1960

2,943,252

SPEED REGULATION OF ELECTRIC MOTORS

Günter Herrmann, Ronnenberg, Deister, Germany, assignor to Protona Produktiongesellschaft für Elektroakustische Gerate G.m.b.H., Hamburg, Germany Filed May 27, 1957, Ser. No. 661,848

2 Claims. (Cl. 318—325)

This invention concerns the speed regulation of electric motors, especially low-voltage miniature motors. Such small motors nowadays play an important part as control motors and the like in drives for precision mechanisms, and in such applications it is often required accurately to maintain a constant speed of rotation.

It has already been proposed, in connection with miniature motors, to utilise centrifugally operated contacts for electric motor speed regulation. In low-voltage motors, however, the high current load on the interrupter contacts raises substantial difficulties, whilst the irregular interruption of the motor current interferes with the smooth running of the drive and makes it difficult to maintain low speeds of rotation.

For this reason recourse has been made to so-called spasmodic speed regulation, in which the motor current is periodically interrupted by means of an interrupter member rotated in dependence upon the motor speed, and having alternately conducting and non-conducting sectors, the width of which varies preferably uniformly along their length. In this connection it is already known to arrange the conducting and non-conducting sectors in star-like manner on a circular disc, or coronally on a roller, the disc or roller acting as an interrupter member, and to adjust the interruption frequency manually by radial displacement of a brush relative to the disc, or by axial displacement of the brush along the roller. Whilst these conventional arrangements permit of adjustment to any desired speed of rotation, they do not allow the latter to be automatically controlled.

According to the present invention, the interruption frequency and thereby the speed of rotation of the motor is automatically controlled by means of a centrifugal system. The centrifugal system results in an automatic mutual displacement of the interrupter member and the current takeup brush making contact therewith, in dependence upon the speed of rotation of the motor to be controlled, so that an automatic adjustment of the interruption frequency, and of the speed of rotation of the motor is attained. The speed control is achieved with a narrow tolerance and a comparatively constant interruption frequency, so that a control device incorporating the invention is capable comparatively simply of being electrically suppressed. A speed control device as proposed by the invention requires virtually no attention and is, therefore, especially suitable for enclosed drives for magnetic sound recording and reproducing apparatus, which are supplied from batteries, the voltage of which varies with time, the said drives nevertheless having to run with a constantly uniform speed. The control device may be arranged to interrupt the motor current supply directly or via auxiliary switching means. Centrifugal weights, of course, are not absolutely necessary for the smooth running of drives having such a control device.

The centrifugal system of the control device proposed by the invention may conveniently consist of an interrupter member and at least one brush making contact therewith, the interrupter member and the brush being mutually displaceable in dependence upon the speed of rotation. The interrupter member may, for example, be uniformly divided around its circumference and have alternately conducting and non-conducting sectors, such that the width of the conducting sectors increases in the direction in which the brush or brushes are relatively displaced with increasing speed of rotation, the width of the non-conducting sectors correspondingly decreasing. The increase of width can be uniform, or depedent upon the desired regulation characteristic it can take place in a graduated manner or according to a given curve. The interrupter body may in known manner consist of a circular disc having star-like conducting and non-conducting sectors distributed around the circle. Alternatively, again in known manner, it can be constructed as a drum having conducting and non-conducting sectors distributed coronally around the drum. The interrupter member may be arranged to be rotated either by the motor shaft itself or by a drive or gearing shaft, and may be centrifugally displaceable in dependence upon the speed of rotation, leaving the brushes stationary. Conversely the brushes may be arranged to rotate and to be controlled by centrifugal force, the interrupter member then being allowed to remain stationary.

Figure 2:
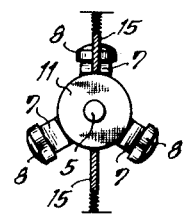
Figure 3:
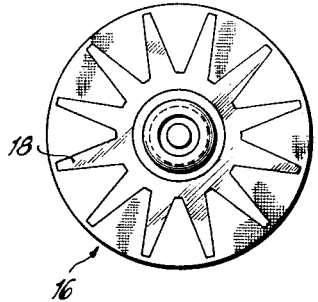
Figure 4:
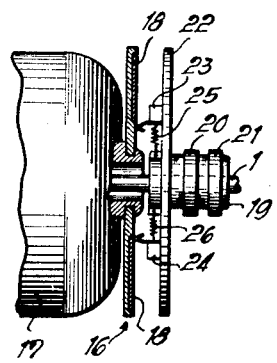

The invention will be described further, by way of example, with reference to the accompanying drawings, in which:

Fig. 1 is a side elevation of a control means constructed in accordance with the invention and having a rotatable drum-like interrupter member and two fixed brushes, Fig. 2 is a plan view of the control means of Fig. 1, seen from the left, Fig. 3 is a front elevation of an alternative embodiment of control means having a stationary disc-like interrupter member for radially arranged rotating brushes controlled by centrifugal force, in which the brushes have been omitted for the sake or clarity, and Fig. 4 is a side elevation of the control means having the interrupter member shown in Fig. 3.

In the control means shown in Fig. 1, an insulating ring 6 is fixedly mounted or keyed on a motor- or driveshaft 5. This insulating ring 6 is mechanically connected via three equiangularly positioned deflection springs 7 having centrifugal weights 8 with the flange 9 of a second insulating member 10 slidingly journalled on the shaft 5. An interrupter member 11 is fixedly connected with the insulating member 10, and comprises an insulating member in whose circumferential surface is embedded an electrically conducting crown, e.g. a copper crown 12. Thus there are formed around the circumference of the drum constituting the interrupter member 11, conducting sectors 13 which alternate with non-conducting sectors 14, the arrangement being such that the conducting sectors 13 decrease in width in the direction of displacement of the brushes 15, whilst the non-conducting sectors become correspondingly wider. The conducting sectors 13 do not extend completely as far as the outermost left-hand edge of the drum, and the left-hand section of the drum thus comprises a non-conducting ring. The two brushes 15 are arranged in series with the motor circuit.

This interrupter control means operates as follows:

In the rest condition the deflection springs 7 lie almost flat and urge the interrupter member 11 wholly towards the left. The brushes 15 consequently rest on the closed conducting foot of the crown. The motor circuit is closed and the motor can thus immediately commence to run. With increasing speed of rotation the springs 7 become radially deflected under the influence of the centrifugal weights 8 and consequently draw the sliding member 10 having the interrupter member 11 towards the right, so that the brushes 15 with increasing speed of rotation, are caused more and more frequently, and for longer periods to make contact with the non-conducting portions of the drum circumference. Thus there occurs a corresponding interruption frequency and corresponding duration of the interruptions, until a balance is attained between the motor speed and the interruptions.

The control means according to Figs. 3 and 4 employs a disc as the interrupter member. For this purpose an insulating disc generally designated 16 is fixedly connected, for example, to the drive mechanism or on the motor cover 17. An electrically conducting star 18 is embedded in the insulating disc 16 and exhibits teeth distributed uniformly around the disc, these teeth decreasing in size towards the outer periphery, whilst the non-conducting sectors lying there-between correspondingly widen. On the motor- or drive-shaft 1 is carried an insulating member 19 with two slip-rings 20 and 21. The insulating member 19 carries a disc 22 which is formed across one diameter with grooves (not shown), in which two centrifugal brushes 23 and 24 can move outwardly against return springs 25 and 26, under the influence of centrifugal force. The brush 23 may be connected with the slip-ring 20 and the brush 24 with the slip-ring 21. The slip-rings 20 and 21 are in series with the motor circuit. When the drive mechanism or the motor, as the case may be, is stationary, the return springs 25, 26 urge the brushes 23, 24 wholly inwardly so that they lie on the closed conducting centre of the star and the slip rings 20, 21 are thus in effect short-circuited. As the speed of rotation increases the centrifugally governed brushes 23, 24 move outwardly whereby, as in the control means shown in Fig. 1 there occur in the motor current, interruptions of increasing frequency and increasing duration, until the desired balance between the speed of rotation and the frequency of the interruptions has been attained.

In both the constructions shown, the interrupter member must be constructed after the manner of conventional commutators used in electric motors, i.e. the conducting surfaces and non-conducting surfaces must form a continuous surface without setting up undesirable mechanical resistances, so that the brushes suffer as little wear and sparking as possible on passing from the non-conducting to the conducting surfaces. Sparking can, of course, be eliminated in conventional manner by means of spark-quenching circuits, utilising resistors or condensers in parallel with the interrupter contacts, and by appropriate choice of brushes.

The control means proposed by the invention is adapted for arrangement directly in the motor housing. For this purpose the control means shown in Figs. 3 and 4 is particularly suitable, having regard to its very small axial space requirements.

I claim:

1. A speed control means for electric motors, especially low-voltage motors, comprising a flat disc-like interruptor member periodically interrupting the current supply of said motor, a star-like arrangement of a plurality of alternatively conducting and non-conducting sectors arranged on said interruptor member and a centrifugal system in combination with said interruptor member to vary the frequency of interruption consisting of two current-carrying brushes rotating in dependence upon the speed of said motor and being radially movable by centrifugal force in straight-line over said alternatively conducting and non-conducting sectors, a second flat disc opposed and parallel to said first flat disc, said second flat disc being rotatable in dependence upon the speed of said motor and said two centrifugally radially movable current-carrying brushes being slidably arranged on said second disc so as to make sliding contact with the conducting sectors of said first disc and spring means opposing the movement of said brushes.

2. A speed control means as set forth in claim 1 wherein the width of the sectors is varied to correspond to the intended motor regulation characteristic.

References Cited in the file of this patent

UNITED STATES PATENTS

| | | |
|---|---|---|
| 129,085 | Barjon | July 16, 1872 |
| 248,434 | Edison | Oct. 18, 1881 |
| 1,656,962 | Sperry | Jan. 24, 1928 |